United States Patent
Matejka et al.

(10) Patent No.: US 10,331,721 B2
(45) Date of Patent: Jun. 25, 2019

(54) SYSTEMS AND METHODS FOR VISUALIZING RELATIONSHIPS BETWEEN PUBLICATIONS

(75) Inventors: Justin Frank Matejka, Newmarket (CA); Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 79 days.

(21) Appl. No.: 13/530,003

(22) Filed: Jun. 21, 2012

(65) Prior Publication Data
US 2013/0346900 A1 Dec. 26, 2013

(51) Int. Cl.
G06F 15/177 (2006.01)
G06F 16/34 (2019.01)

(52) U.S. Cl.
CPC .................................. G06F 16/34 (2019.01)

(58) Field of Classification Search
CPC ...... G06F 3/048; G06F 3/0484; G06F 3/0482; G06F 3/04817; G06F 3/0481; G06F 3/04842; G06F 17/30011
USPC .............. 715/209, 277, 764, 771, 783, 838; 706/18
See application file for complete search history.

(56) References Cited

U.S. PATENT DOCUMENTS 6,499,026 B1 * 12/2002 Rivette et al.
7,734,567 B2 * 6/2010 Okamoto et al.
2003/0046306 A1 * 3/2003 Yokoshi ................. G06Q 10/06
2003/0046307 A1 * 3/2003 Rivette et al. ............. 707/104.1
2004/0123235 A1 * 6/2004 Yeh et al. ....................... 715/513
2004/0183837 A1 * 9/2004 Watanabe et al. ............. 345/853
2006/0271883 A1 * 11/2006 Bier et al. ...................... 715/853
2007/0239706 A1 * 10/2007 Zhang ............... G06F 17/30728
2007/0288442 A1 * 12/2007 Iwayama et al. ................ 707/3
2008/0068401 A1 * 3/2008 Albrecht et al. .............. 345/645
2008/0134060 A1 * 6/2008 Albrecht et al. .............. 715/762
2008/0313166 A1 * 12/2008 Yu et al. ........................... 707/5

(Continued)

OTHER PUBLICATIONS

An, Yuan, Jeannette Janssen, and Evangelos E. Milios. "Characterizing and mining the citation graph of the computer science literature." Knowledge and Information Systems 6.6 (2004): 664-678.*

(Continued)

*Primary Examiner* — Thanh T Vu
(74) *Attorney, Agent, or Firm* — Artegis Law Group, LLP

(57) ABSTRACT

A system and method are disclosed for illustrating relationships between a set of objects on a display device. An image is generated and displayed on the display device that includes a graphical representation for each of the objects. One of the objects in the set of objects is selected, and an application determines relationships between the selected object and a subset of the other objects. Connectors (i.e., a graphic overlay) are rendered over the image to show the relationship between one object and another object. Indirect relationships may be shown by drawing connectors between one object and a related object that connect one or more intervening objects. In one embodiment, the objects are publications stored in a digital repository and the relationships between publications are determined by examining references to other publications included in citations. Additional information, such as metadata, may also be rendered in the image.

16 Claims, 11 Drawing Sheets

(56) References Cited

U.S. PATENT DOCUMENTS

2011/0029476 A1* 2/2011 Kasravi et al. ................. 706/54
2011/0179035 A1* 7/2011 Zhang et al. ................. 707/739
2011/0246473 A1* 10/2011 Stec ................. G06F 17/30595
                                                                  707/741

OTHER PUBLICATIONS

Brügmann, Sören. "Advanced Patent Document Processing Techniques." Month 4 (2006): 09-5.*
Boutin, François, and Mountaz Hascoët. "Multi-level exploration of citation graphs." Research and Advanced Technology for Digital Libraries. Springer Berlin Heidelberg, 2004. 366-377.*
Liu, Zhiqiang, and Donghua Zhu. "Web Mining Based Patent Analysis and Citation Visualization." Web Mining and Web-based Application, 2009. WMWA'09. Second Pacific-Asia Conference on. IEEE, 2009.*
Boutin, Francçis, and Mountaz Hascoët. "Multi-level exploration of citation graphs." Research and Advanced Technology for Digital Libraries. Springer Berlin Heidelberg, 2004. 366-377.*
Gephi Tutorial Visualization. http://gephi.org/tutorials/gephi-tutorial-visualization.pdf, Last updated May 26, 2010.*
R. D. Horn and J. D. Birdwell, "Link Discovery Tool", Proc. ONDCP/CTAC 1997 International Symposium, Chicago, Ill., Aug. 18-22, 1997.*
Archive of link "https://gephi.org/tutorials/gephi-tutorial-visualization.pdf" on Wayback Machine (https://web.archive.org). First save on Nov. 21, 2010.*

* cited by examiner

Object 320(1)

| Column | Data |
|---|---|
| *Conference* | CHI |
| *Year* | 2008 |
| *Title* | Citations in Papers |
| *Abstract* | This is an Example Abstract ... |
| *Authors* | Andrew Buck |
| *DOI* | 10.1145/108844.108845 |
| *References* | <ref_1>, <ref_2>, ... |

Figure 3B

Object 320(2)

| Column | Data |
|---|---|
| *Conference* | CHI |
| *Year* | 2007 |
| *Title* | Another Citation |
| *Abstract* | Another Abstract ... |
| *Authors* | Matt Andrews, Sam Jones |
| *DOI* | 10.1145/108844.105412 |
| *References* | <ref_1>, <ref_2>, ... |

Figure 3C

SYSTEMS AND METHODS FOR VISUALIZING RELATIONSHIPS BETWEEN PUBLICATIONS

BACKGROUND

Technical Field

The present disclosure relates generally to the genealogy of research publications and, more specifically, to systems and methods for visualizing relationships between a subset of publications stored in a digital repository.

Description of the Related Art

Research publications use citations to provide detailed references to previous works which have a bearing on the subject of the current publication. Publications may contain citations to previous works in footnotes or endnotes. Other publications may include citations inline within the text (e.g., citations in legal opinions). Citations usually have a standard format, which allows a reader to quickly and easily determine the sources referenced by a publication. For example, given online article repositories such as the ACM Digital Library (located at http://dl.acm.orq) and Google Scholar (located at http://scholar.google.com), reviewing a list of articles referenced by a particular paper has become relatively straightforward.

Typically, the references cited by a publication are viewed as a textual list. A textual list does not convey information about the relationships between publications as well as a graphical display. Furthermore, visualizations conventionally display only a single generation of references (i.e., a list of publications cited by the publication as well as a list of publications that cite the publication) rather than multiple generations, which prevent a user from easily discovering related publications that are not directly referenced by a particular publication. Thus, conventional visualizations of references cited by a publication do not provide broad contextual information useful to a person searching through a large database of publications.

Therefore, what are needed in the art are techniques for visualizing the genealogy of publications collected in a database that address one or more of the problems set forth above.

SUMMARY

One example embodiment of the present disclosure sets forth a method for displaying one or more relationships between objects on a display device. The method includes the steps of generating an image that includes a graphical representation for each object in a set of objects, selecting a first object in the set of objects based on user input, determining a subset of one or more objects included in the set of objects, and overlaying, on the image, a connector that indicates a relationship between the first object and a second object that is included in the subset of objects. Each object included in the subset of objects is related to the first object. For example, each object in the subset of objects may include a reference to the first object. The connector is a graphical overlay drawn over the image and associated with a first graphical representation that corresponds to the first object and a second graphical representation that corresponds to the second object.

Another example embodiment of the present disclosure sets forth a computer-readable storage medium including instructions configured to perform the method set forth above. Yet another example embodiment of the present disclosure sets forth a system including a processor and a memory including an application configured to perform the method set forth above.

One advantage of the disclosed approach is that the visualization technique enabled by generation of an image provides a snapshot of the entire corpus of the data set (i.e., the set of publications or research papers). The citations included in the publications enable a user to filter the data set to focus on the related publications. Citations in a publication related to a particular subject matter have a high correlation of being included in a different publication related to that same subject matter. Therefore, a user can easily visualize which publications in the set have a higher likelihood of being related to a particular topic of interest. This form of graphical display may be more efficient than displaying relationships based on citations in a textual list as the visualization provides a broader context than such lists.

BRIEF DESCRIPTION OF THE DRAWINGS

So that the manner in which the above recited features can be understood in detail, a more particular description, briefly summarized above, may be had by reference to certain example embodiments, some of which are illustrated in the appended drawings. It is to be noted, however, that the appended drawings illustrate only typical embodiments and are therefore not to be considered limiting the scope of the claims, which may admit to other equally effective embodiments.

FIGS. 3A-3C illustrate a database for storing a digital repository of publications, according to one example embodiment of the present disclosure;

For clarity, identical reference numbers have been used, where applicable, to designate identical elements that are common between figures. It is contemplated that features of one example embodiment may be incorporated in other example embodiments without further recitation.

DETAILED DESCRIPTION

In the following description, numerous specific details are set forth to provide a more thorough understanding of the disclosure. However, it will be apparent to one of ordinary skill in the art that the embodiments described herein may be practiced without one or more of these specific details. In other instances, well-known features have not been described in order to avoid obscuring details of the embodiments.

System Overview

Figure 1:
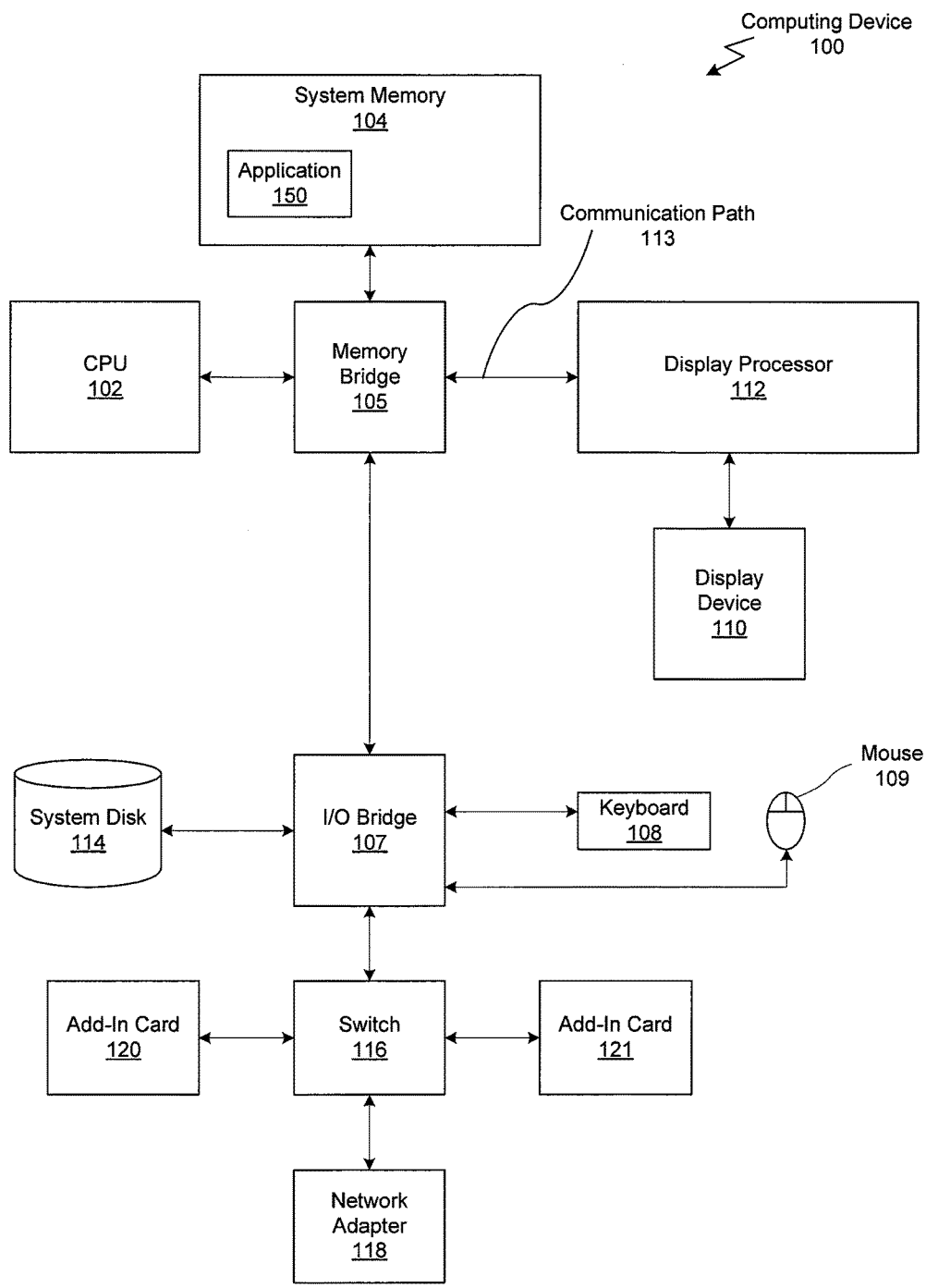
FIG. 1 is a block diagram of a computing device configured to implement one or more aspects of the present disclosure.

FIG. 1 is a block diagram of a computing device 100 configured to implement one or more aspects of the present disclosure. As shown in FIG. 1, computing device 100 includes one or more processing units, such as central processing unit (CPU) 102, and a system memory 104 communicating via a bus path that may include a memory bridge 105. CPU 102 includes one or more processing cores, and, in operation, CPU 102 is the master processor of computing device 100, controlling and coordinating operations of the other system components. System memory 104 stores software applications and data for execution or processing by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link). In one embodiment, display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 may be configured to provide display device 110 with either an analog signal or a digital signal.

A system disk 114 is also connected to I/O bridge 107 and may be configured to store content, applications, and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computing device 100 to communicate with other systems via an electronic communications network, and may include wired or wireless communication over local area networks and wide area networks such as the Internet.

Other components (not shown), including USB or other port connections, audio cards, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCIe), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

CPU 102 provides display processor 112 with data and/or instructions defining the desired output images, from which display processor 112 generates the pixel data of one or more output images. The data and/or instructions defining the desired output images can be stored in system memory 104 or a graphics memory within display processor 112. In one embodiment, display processor 112 includes 3D rendering capabilities for generating pixel data for output images from instructions and data defining the geometry, lighting, shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may include a graphical user interface for displaying visualizations of publication genealogy. In one embodiment, application 150 may be a web browser for displaying web pages that implement visualizations of publication genealogy via HTML (Hyper Text Markup Language), JavaScript, Adobe® Flash, or other internet technologies. In another embodiment, application 150 may be a stand-alone application configured to access a database of publications stored locally on system disk 114 or remotely on a server connected to a network and accessed via NIC 118.

It will be appreciated that the computing device shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107. Examples of computing device 100, non-exhaustive, include a desktop computer, a laptop computer, a hand-held device, a PDA (personal digital assistant), a cellular phone, or other electronic device capable of displaying graphical data.

Figure 2:
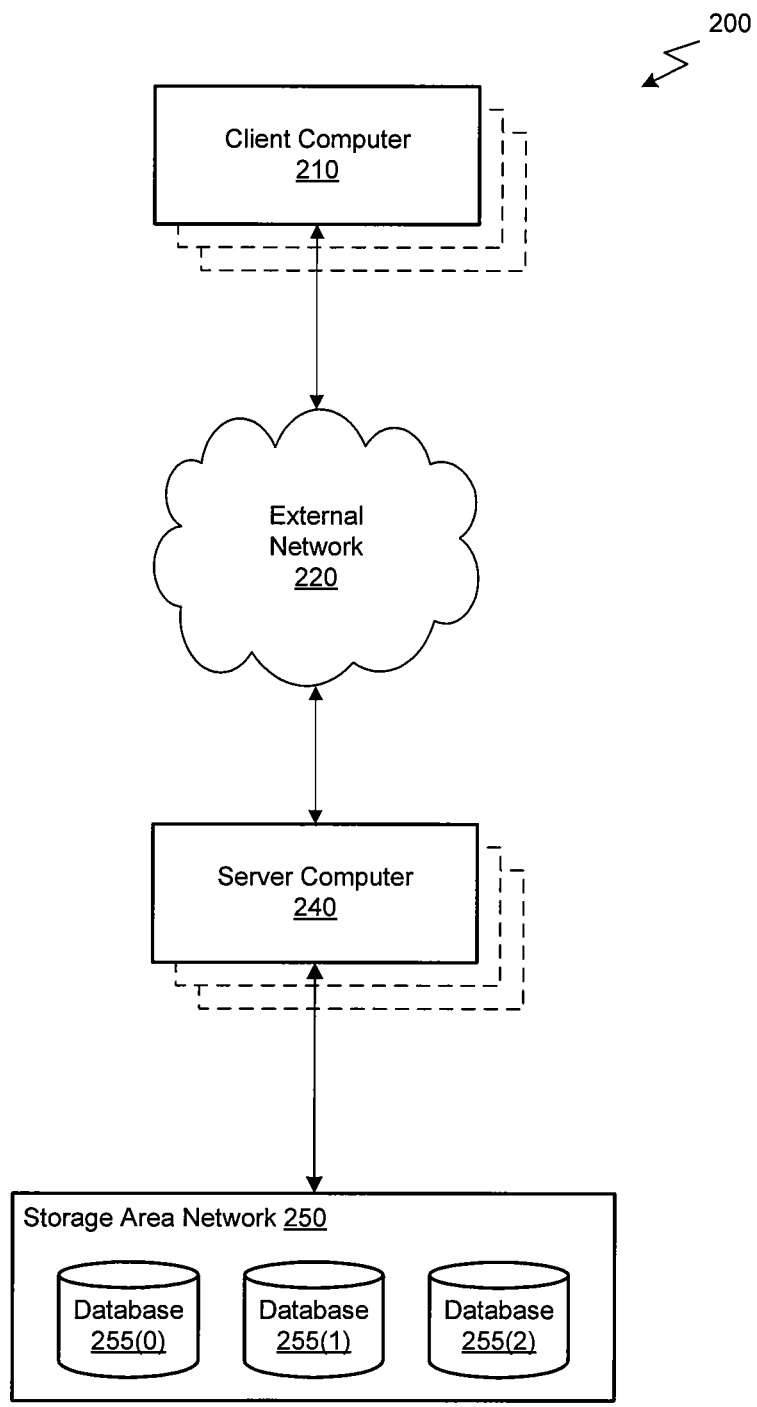
FIG. 2 illustrates a computer network configured to implement one or more aspects of the present disclosure.

FIG. 2 illustrates a computer network 200 configured to implement one or more aspects of the present disclosure. As shown in FIG. 2, network 200 includes one or more client computers 210 and one or more server computers 240. Client computer 210, which may be similar to computer system 100, connects to a server computer 240 via external network 220. In one embodiment, external network 220 is the Internet. Server computer 240 is connected to storage area network (SAN) 250 which includes one or more databases 255 that store information related to a set of publications. SAN 250 may include a plurality of blade servers connected via links defined by various networking protocols such as the ATA over Ethernet (ATAoE) protocol or the Fibre Channel Protocol (FCP) implemented over a Fiber Channel network. Each server in SAN 250 includes attached storage such as a disk array for storing the databases 255 and any other data required by server computers 240.

Server computer 240 may be configured to manage a database 255(0) that includes a plurality of objects corresponding to various publications. Multiple databases (e.g., 255(0), 255(1), etc.) may be maintained for different digital repositories. For example, database 255(0) may correspond to the ACM Digital Library database whereas database 255(1) may correspond to the Google Scholar database. In some embodiments, database 255 may be a local database stored on a system disk 114 of a client computer 210 that can be queried directly by application 150.

In one embodiment, an application 150, executing on client computer 210, displays an image that illustrates a publication genealogy for a selected publication. When the application 150 requests a web page from a server computer 240, an application in the server computer 240, such as an ASP.NET web form (Active Server Pages) or a JSP web form (Java Server Pages), may generate an image that includes graphical representations for each of the publications in database 255 as well as graphical objects overlaid on top of the graphical representations that allow a user to visualize the relationships between a selected publication and each of the other publications in the database. The application on server computer 240 may then return the image as a portion of the web page to be displayed on display device 110 by client computer 210.

In another embodiment, the web page may include a Java Applet that is configured to generate the image dynamically based on information retrieved from server computer 240 by the Applet. For example, server computer 240 processes a request from the Applet for information related to the genealogy of a publication selected by a user. The server computer 240 collects the requested information and transmits the information back to the Applet, which generates an image based on the information. In order to retrieve the requested information, an application stored on server computer 240, such as an ASP.NET web form, may query a database 255 to determine information related to the references to other publications included in citations in the selected publication. In this manner, the application may consolidate information about the references in the publication, thereby generating a list of references related to the publication by one or more degrees of separation (i.e., generations). The application then transmits this information back to the Applet to generate and display the image.

In yet other embodiments, server computer 240 may enable application 150 to query database 255 indirectly through queries transmitted via various internet protocols. For example, application 150 may transmit an SQL web query to an SQL web server executing on server computer 240. The SQL web server may query the database 255(0) and return the result to application 150. Application 150 may then generate the image using the information returned from the query. It will be appreciated that other techniques may be implemented for querying database 255(0) from client computer 210 such as via protocols other than SQL. In still other embodiments, application 150 may be configured to query a database 255(0) stored locally on system disk 114.

Figure 3A:
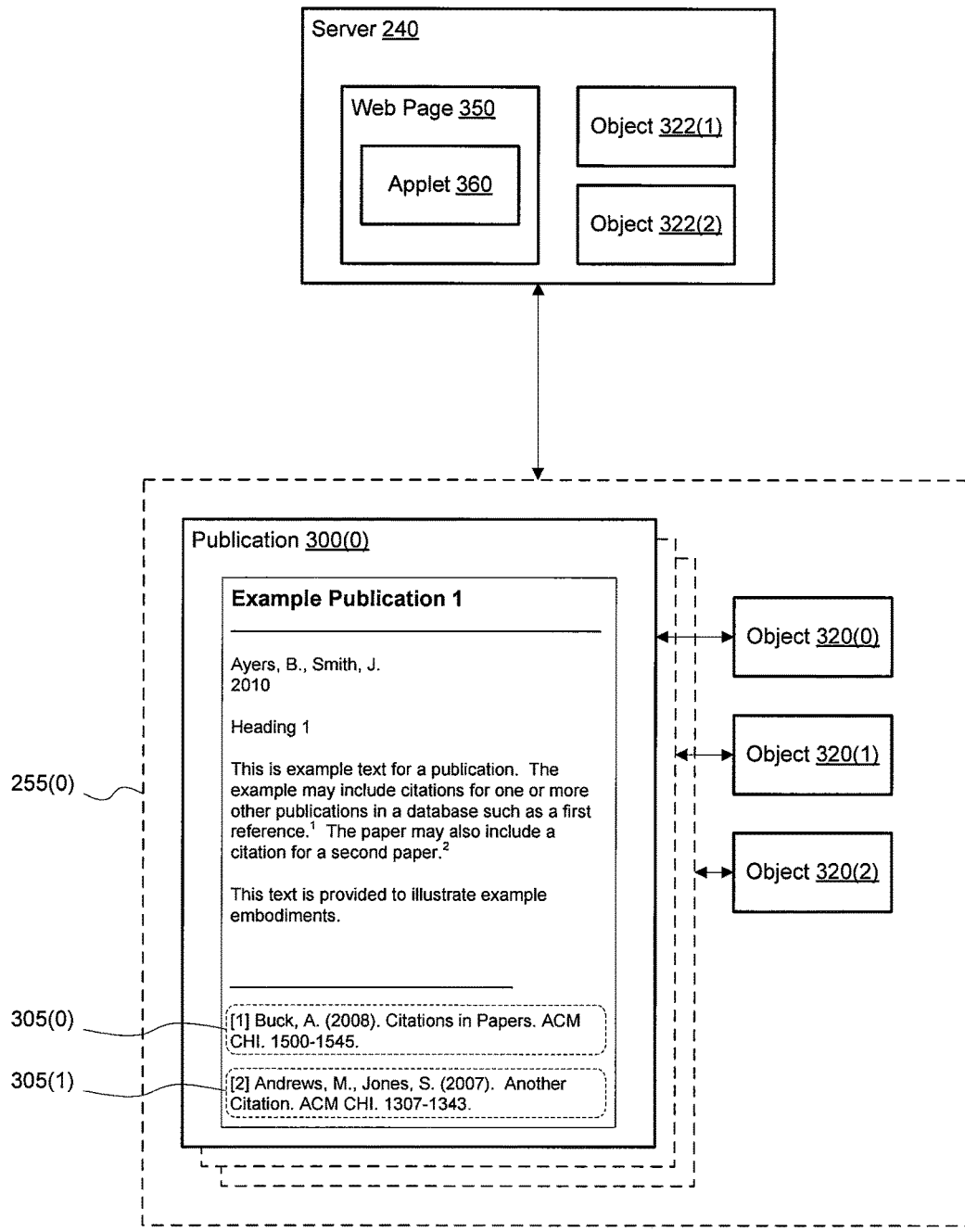

FIGS. 3A-3C illustrate a database 255(0) for storing a digital repository of publications, according to one example embodiment of the present disclosure. As shown in FIG. 3A, the database 255(0) includes a plurality of publications 300 as well as a plurality of objects 320 corresponding to the plurality of publications 300 that include metadata associated with each of the publications 300 in the database 255(0). The objects 320 will be described in more detail below in conjunction with FIGS. 3B and 3C. Returning to FIG. 3A, publications 300 are stored in a digital format such as the Portable Document Format (pdf) or other technically feasible formats and may include a title, one or more authors, headings, and text. Footnotes, or other techniques for referencing a publication in a citation, may be included within the text of the publications 300. For example, the text in publication 300(0) includes two footnotes 305, which reference two additional publications 300(1) and 300(2) in database 255(0). It will be appreciated that footnotes are shown as one example of providing citations, but endnotes and inline citations as well as any other technically feasible way for including citations may also be implemented within the publications 300. In some embodiments, publications 300 may be stored as web pages in an HTML format and references may be included as <a> tags within the HTML markup.

In order to increase the efficiency of querying database 255(0), metadata associated with the publications 300 may be stored in corresponding data objects 320 that enable expedited queries to be performed that do not access the publications 300 directly. In one embodiment, each publication 300 in database 255(0) is associated with a data object 320 that includes metadata associated with that publication 300. Objects 320 may be stored in database 255(0) or in a separate area in SAN 250 associated with database 255(0). Server 240, when executing a query of database 255(0), may simply access the data objects 320 associated with the publications 300 rather than searching or parsing through the content in the publications 300. For example, the data in the data objects 320 may include a title of the associated publication 300, links to any references cited in the publication 300, and a list of the authors of the publication 300. Server 240 may then search through each of the data objects 320 to retrieve a list of titles for all publications in the database 255. A query of database 255 may return copies 322 of a subset of data objects 320 to the server 240. The copies 322 are shown in FIG. 3A as a local copy 322(1) associated with object 320(1) and a local copy 322(2) associated with object 320(2), which may correspond to the publications referenced in a first citation 305(0) and a second citation 305(1) in publication 300(0), respectively. Server 240 may then process the copies 322 to generate an image of a publication's genealogy that is transmitted to client computer 210 for display (e.g., within web page 350). Alternatively, the web page 350, including a Java Applet 360, may be transmitted to the client computer 210. The Applet 360, executing on the client computer 210, may request information (e.g., objects 322) from database 255, which are returned to the Applet 360 by server computer 240 for processing. The Applet 360 then processes the data and generates an image that is displayed in web page 350.

As shown in FIGS. 3B and 3C, objects 320(1) and 320(2) include the metadata associated with the publications 300(1) and 300(2), respectively, which are cited as references in publication 300(0). In one embodiment, objects 320 are stored in a tab-delimited text file that comprises a plurality of columns for storing data. Each of the columns in objects 320 represents a different category of metadata describing the associated publication 300. For example, FIG. 3B illustrates metadata associated with a first publication 300(1) referenced by a first citation 305(0) in publication 300(0), and FIG. 3C illustrates metadata associated with a second publication 300(2) referenced by a second citation 305(1) in publication 300(0). As shown, the metadata includes a conference identifier (e.g., "CHI"), a year of publication (e.g., "2008"), a title of the publication (e.g., "Citations in Papers"), an abstract of the publication (e.g., "This is an Example Abstract . . . "), a list of authors of the publication (e.g., "Andrew Buck"), a digital object identifier (DOI) (e.g., "10.1145/108844.108845"), and a list of references to publications cited in the publication (e.g., "<ref_1>, <ref_2>, . . . "; the labels "<ref_x>" are used herein as placeholders for the actual identifiers associated with the reference, that may be stored in the same format as the DOI). The DOI is a globally unique value associated with an object for identifying the object in a digital medium, such as on the Internet. DOIs are registered and maintained by the International DOI Foundation (IDF). It will be appreciated that, in alternate embodiments, other types of identifiers may be implemented in lieu of the DOI format standardized by the IDF, such as by including an URL (uniform resource locator) for a digital copy of the object.

Visualization of Publication Genealogy

Figure 4:
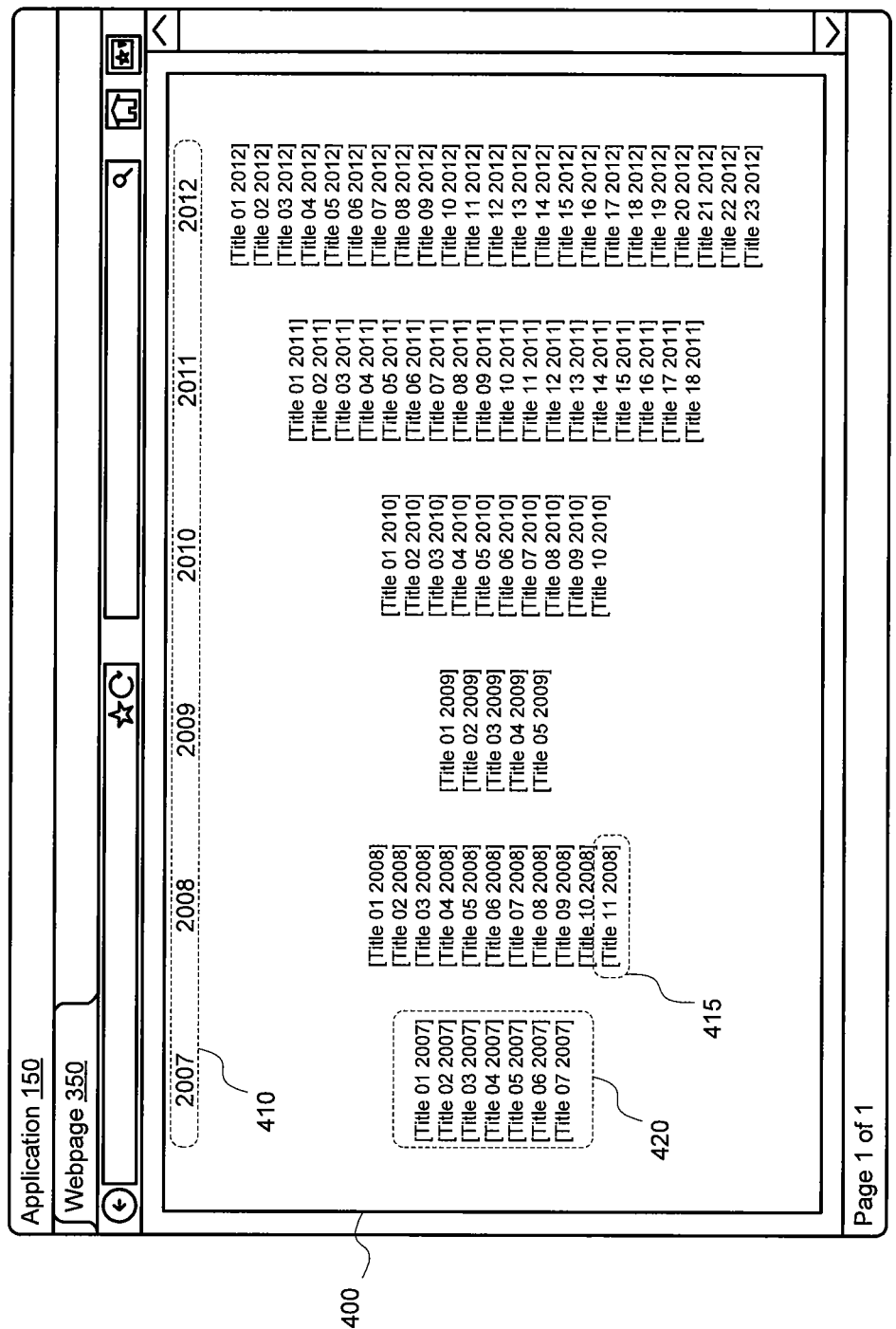
FIG. 4 illustrates one technique for displaying an image that illustrates a genealogy for a selected publication in a set of publications, according to one example embodiment of the present disclosure.

FIG. 4 illustrates one technique for displaying an image 400 that illustrates a genealogy for a selected publication 300(0) in a set of publications 300, according to one example embodiment of the present disclosure. As shown in FIG. 4, a web page 350 may be displayed in an application 150 (i.e., web browser). The web page 350 includes an image 400 (i.e., a visualization) of the genealogy between related publications 300. The image 400 may be a dynamically generated image that is resolved by server 240 and transmitted to client computer 210 for display in web page 350. Alternatively, the image 400 may be a collection of objects (e.g., hypertext markup elements), resolved into images by the application 150 and displayed in the web page 350. The image 400 may be generated dynamically by an Applet 360 executing within the web page 350. Certain aspects of the present disclosure may be described in relation to functions implemented by application 150 or features configurable within application 150. It will be appreciated that the description of such functions or features are equally applicable to functions or features implemented within Java Applet 360 and that reference to any such functions and features of application 150 may also be incorporated into Applet 360.

In one embodiment, the image 400 includes graphical representations 415 for publications 300 in a database 255(0) on a single screen, providing the user with a visualization of the publications 300 in the database 255(0). In one embodiment, the graphical representations 415 of the publications 300 are text-based listings of the titles of the publications 300. In other embodiments, the graphical representations 415 may be icons, thumbnails, geometric shapes (e.g., circles), or any other technically feasible graphic object that represents a publication 300.

The image 400 includes a header portion 410 at the top of the frame. The header portion 410 includes column headings for each year of publication associated with the various publications 300 in database 255(0). In some embodiments, the column headings may represent a range of years, such as 1900-1910. In other embodiments, column headings may represent a different characteristic associated with the publications 300 included in the metadata stored in the data objects 320 associated with the publications 300. For example, column headings may represent the first letter of the first author's last name.

Graphical representations 415 of the various publications 300 in database 255(0) are displayed in columns 420 under the corresponding column headings in the header portion 410. The columns 420 list, sequentially, the title of each publication 300 in the database 255(0) that is associated with the corresponding column heading. For example, the column 420 for publication year 2007 includes 7 publications that were published in 2007, the column for publication year 2008 includes 11 publications that were published in 2008, and so forth. As shown in FIG. 4, each column 420 is centered along an axis that runs horizontally across the image 400.

In one embodiment, the publications 300 in a column 420 may be listed in chronological order, such that if [Title 01 2007] was published prior to [Title 02 2007], then [Title 01 2007] is listed above [Title 02 2007] (labels in the format "[Title xx 20xx]" are used herein as a placeholders to represent the actual titles of the publications, which may be displayed in place of the placeholders in a typical implementation of the graphical representations). In other embodiments, the graphical representations 415 for the publications 300 may be sorted in alphabetical order by title or author. In yet other embodiments, the graphical representations 415 for the publications 300 may be sorted such that publications 300 that include the largest number of citations referencing distinct publications 300 are displayed closer to the center of the column 420 and publications that include the smallest number of citations referencing distinct publications 300 are displayed at the extreme top or bottom of the column 420. In other words, the further a publication 300 is listed from the center of the column 420, the smaller the number of citations referenced by the publication 300.

In some embodiments, application 150 may be configured with controls that enable a user to configure the displayed properties of the image 400. Some databases 255 may contain such a large number of publications 300 that visualizing the entire database 255 may be ineffective because the useful information related to the publications of interest may be obscured by the sheer volume of publications reflected within the image 400. In such embodiments, the controls may enable the user to filter the publications 300 in database 255(0) to only display graphical representations 415 related to a filtered subset of publications 300. For example, a user could filter all publications 300 related to a specific author, date range, or keywords contained in the abstract. The image 400 would then include graphical representations 415 for only the subset of publications selected by the chosen filter criteria.

Figure 5:
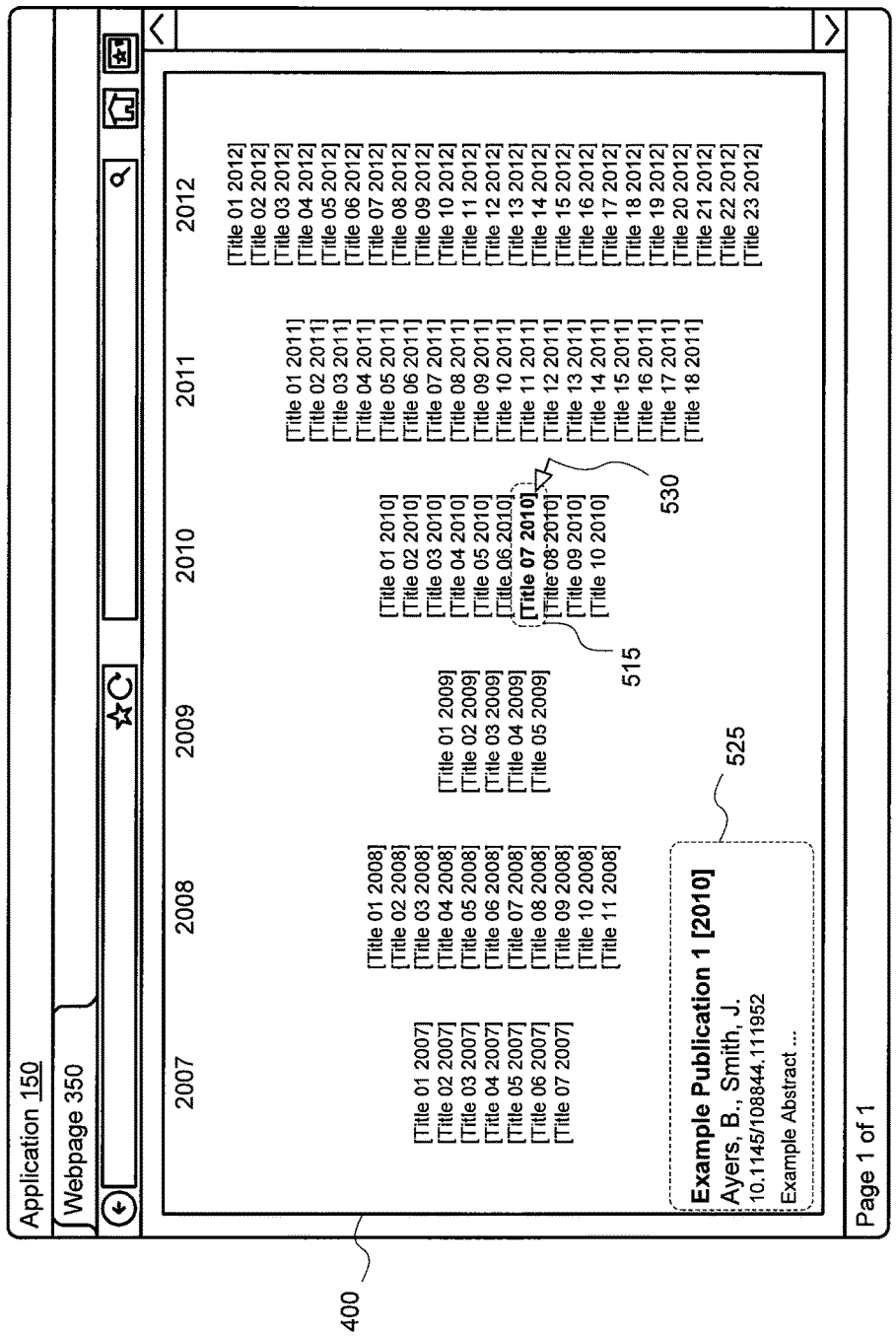
FIG. 5 illustrates one interactive feature of the application, according to one example embodiment of the present disclosure.

FIG. 5 illustrates one interactive feature of the application 150, according to one example embodiment of the present disclosure. As shown in FIG. 5, when a user moves a mouse cursor 530 over the graphical representation 415 for the publications 300 listed in one of the columns 420, information related to the associated publication 300 is displayed in a portion of the image 400. For example, when a user hovers the cursor 530 over graphical representation 515 (i.e., "[Title 07 2010]"), metadata 525 associated with publication 300 (0), which corresponds to graphical representation 515, is displayed in a lower left portion of the graphical representation 400. In one embodiment, the metadata 525 includes a title of the publication, a year of publication, a list of authors, the DOI associated with the publication, and a copy of the abstract of the publication. In alternate embodiments, different information may be included in the metadata 525 in lieu of, or in addition to, the information shown in FIG. 5. In order to represent a large number of publications 300 in the image 400 on a single screen, the size of the graphical representation 415 for each publication 300 may be small. For example, the columns 420 in FIGS. 4 and 5 list a title of the publication as the graphical representation 415 for each publication. The font used for displaying the title may have a size of 2 pt or smaller in order to represent tens, hundreds, or thousands of publications 300 in database 255(0) on one screen displayed to the user. Therefore, when a user hovers the mouse cursor 530 over the graphical representation 415 for a particular publication 300(0), metadata 525 associated with the publication 300(0) may be displayed in order to provide the user with more detailed information than could be included in the columns 420 without overrunning the screen size.

Figure 6:
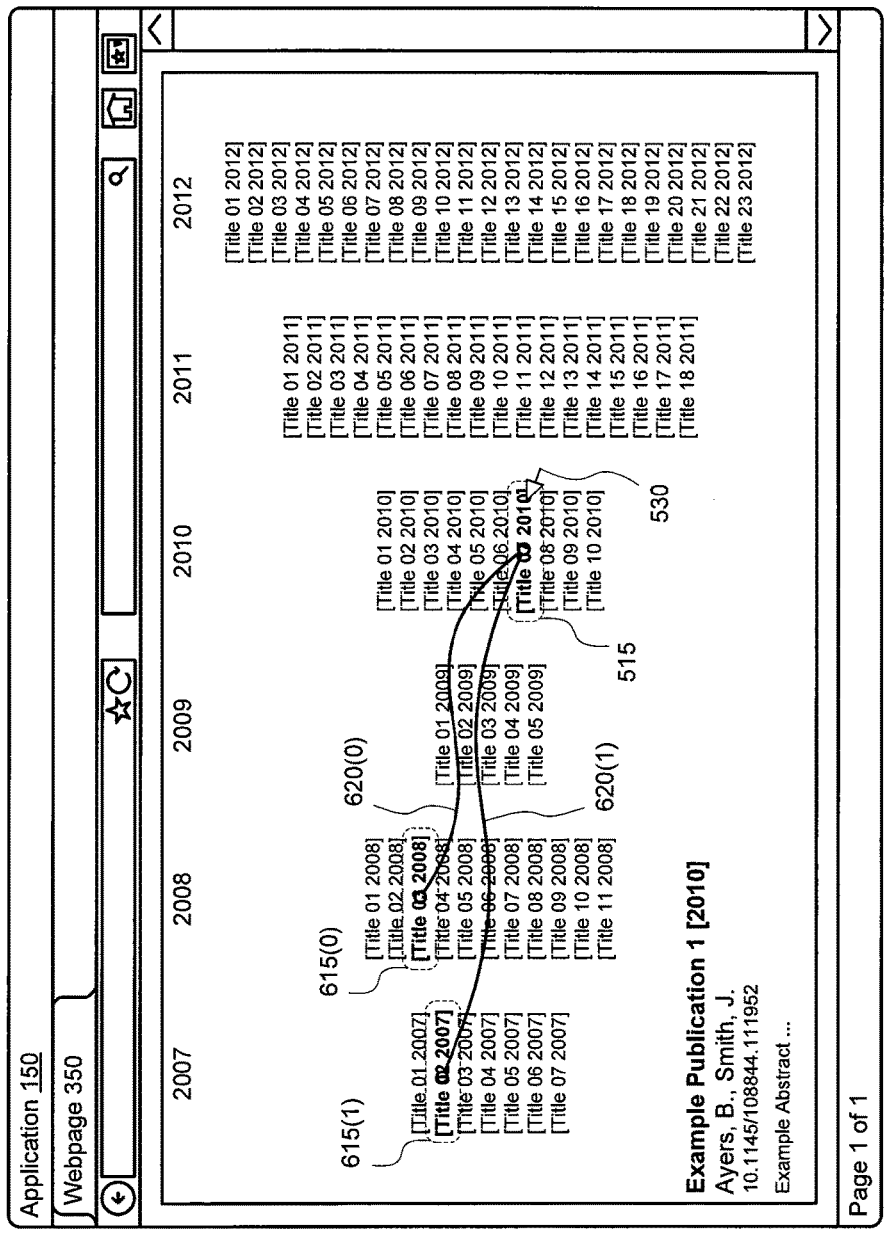
FIG. 6 illustrates one technique for illustrating relationships between publications reflected in the image of FIG. 4, according to one example embodiment of the present disclosure.

FIG. 6 illustrates one technique for illustrating relationships between publications 300 reflected in the image 400 of FIG. 4, according to one example embodiment of the present disclosure. A user may select a publication 300(0) included in the image 400 using mouse cursor 530. As shown in FIG. 5, the selected publication 300(0), which corresponds to graphical representation 515, is highlighted such as by displaying the graphical representation in a different font (e.g., with a bold font style). Metadata 525 related to the selected publication 300(0) may be displayed in the lower corner of the image 400. As discussed earlier, publication 300(0) includes references to two additional publications (e.g., 300(1), 300(2)) in database 255(0). Application 150 may be configured to overlay a graphic object on top of the graphical representations 415 in image 400 to indicate the related publications referenced by the selected publication 300(0). As shown in FIG. 6, connectors 620 (i.e., curved lines) are drawn from the center of the graphical representation 515 for the selected publication 300(0) to the center of each of the graphical representations for publications referenced by the selected publication 300(0). A first connector 620(0) connects the center of the graphical representation 515 for publication 300(0) with the center of the graphical representation 615(0) for publication 300(1). Similarly, a second connector 620(1) connects the center of the graphical representation 515 for publication 300(0) with the center of the graphical representation 615(1) for publication 300(2). The connectors 620 indicate a $1^{st}$ generation relationship between the selected publication 300(0) and the related publications 300(1) and 300(2).

Publications 300(1) and 300(2) may be considered parents of publication 300(0). In other words, publication 300(0) includes a citation to publications 300(1) and 300(2). In contrast, publication 300(0) is a child (i.e., includes a reference to a parent application) of publications 300(1) and 300(2). It will be appreciated that, in addition to displaying connectors 620 associated with each publication referenced by the selected publication 300(0), application 150 may be configured to query database 255 to also determine any children of the selected publication 300(0) and overlay a connector 620 on image 400 to indicate relationships between the selected publication 300(0) and any child publications.

Figure 7:
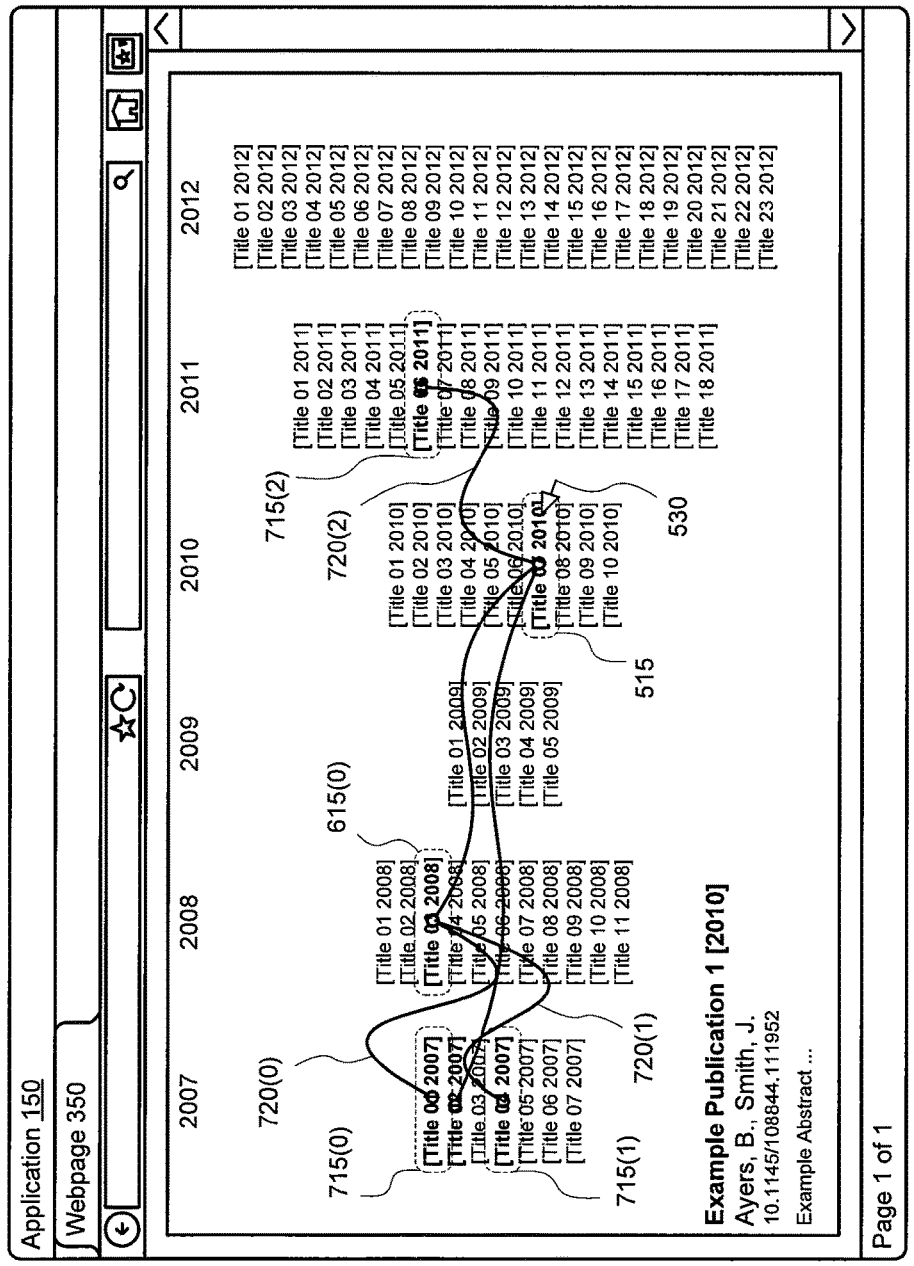
FIG. 7 illustrates another technique for illustrating relationships between publications reflected in the image of FIG. 4, according to another example embodiment of the present disclosure.

FIG. 7 illustrates another technique for illustrating relationships between publications 300 reflected in the image 400 of FIG. 4, according to another example embodiment of the present disclosure. The visualization of publication genealogy is not limited to a single generation of parent and/or child references. In many instances, visualizing multiple generations of related publications may be useful. For example, when searching for related case law, a lawyer may be interested in the cases that were referenced not only in the selected publication 300(0), but also the additional cases referenced by any of the cases referenced by the selected publication 300(0).

Application 150 may be configured to illustrate multiple generations of relationships between publications associated with the selected publication 300(0). As shown in FIG. 7, the selected publication 300(0) may only reference publications 300(1) and 300(2) directly, thereby causing application 150 to display connectors 620(0) and 620(1). However, publication 300(1) may reference additional publications 300(3) and 300(4), corresponding to graphical representations 715 (0) and 715(1), respectively. Thus, application 150 will also draw connector 720(0) between graphical representation 615(0) and 715(0) and connector 720(1) between graphical representation 615(0) and 715(1) to indicate a $2^{nd}$ generation relationship between the selected publication 300(0) and publications 300(3) and 300(4), respectively. Publications 300(3) and 300(4) may be referred to as grandparents of the selected publication 300(0).

Selected publication 300(0) may also be related to child publications that reference the selected publication 300(0). In some embodiments, application 150 may be configured to draw connectors associated with child relationships. As shown in FIG. 7, a connector 720(2) is drawn between the graphical representation 515 for selected publication 300(0) and the graphical representation 715(2) for a child publication 300(5). Application 150 may be configured to draw the connectors related to descendent publications (i.e., child, grandchild, etc.) in a different color than the connectors related to ancestor publications (i.e., parent, grandparent, etc.).

In one embodiment, application 150 may include control elements within the image 400 that allow a user to select the number of generations of relationships to display for a selected publication 300(0). For example, setting a value for the control element to 3, thereby indicating that 3 generations of relationships should be drawn using connectors 620, 720, application 150 may draw connectors 620, 720 between the selected publication 300(0) and any parent, grandparent, and great-grandparent publications as well as any child, grandchild, and great-grandchild publications.

In some embodiments, a user may select multiple publications 300 as "selected publications." In such embodiments, connectors may be drawn between each of the selected publications and their corresponding parent publications or child publications as well as any additional generations enabled by the configuration of application 150.

Figure 8:
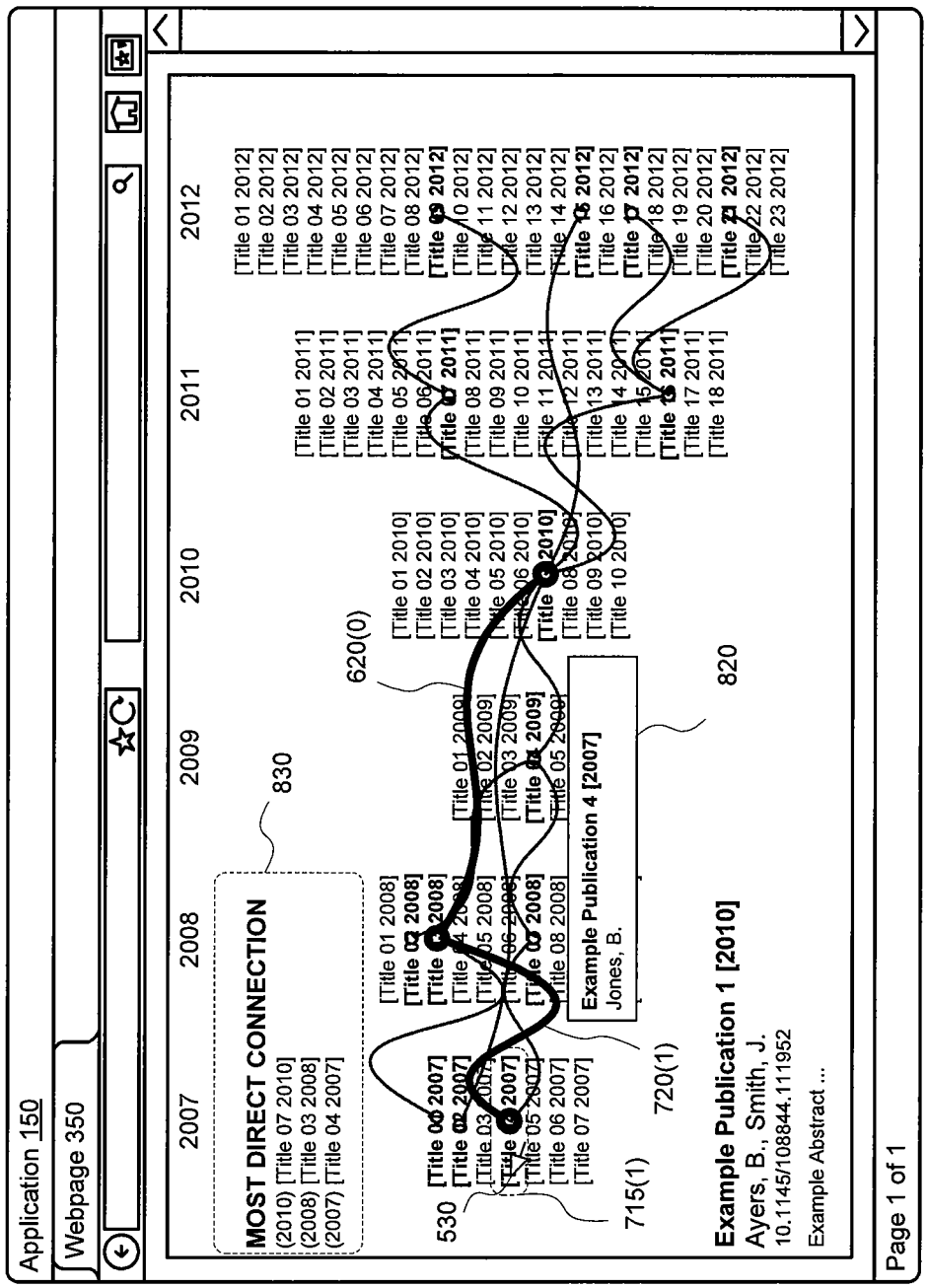
FIG. 8 illustrates yet another technique for illustrating relationships between publications reflected in the image of FIG. 4, according to another example embodiment of the present disclosure.

FIG. 8 illustrates yet another technique for illustrating relationships between publications 300 reflected in the image 400 of FIG. 4, according to another example embodiment of the present disclosure. Once a user has selected a publication 300(0) and the connectors (i.e., 620, 720) are drawn between the graphical representation 515 for the selected publication 300(0) and the graphical representations 415 for any ancestor or descendent publications, the user may wish to view information about a specific publication related to the selected publication 300(0). As shown in FIG. 8, application 150 may be configured to display additional information about a publication 300 when the user hovers the mouse cursor 530 over the graphical representation 415 of a related publication. In one embodiment, the application 150 overlays a tooltip 820 over the image 400 to display certain information related to the publication associated with the graphical representation. For example, as shown in FIG. 8, tooltip 820 displays the title of the publication, the year of publication, and the author of the publication for publication 300(4) that is associated with graphical representation 715(1).

In addition, application 150 may be configured to change the appearance of the connectors (e.g., 620, 720) drawn over the image 400 in order to highlight the most direct connection between the selected publication 300(0) and the publication 300(4) corresponding with the graphical representation 715(1) under mouse cursor 530. For example, as shown, connectors 620(0) and 720(1) have been redrawn with a heavier line weight, whereas all of the other connectors have been redrawn with a lighter line weight. Connectors 620(0) and 720(1) represent the shortest path between the selected publication 300(0) and the publication 300(4). Even though publication 300(4) is also connected to selected publication 300(0) via the path from [Title 07 2010], [Title 04 2009], [Title 07 2008], and [Title 04 2007], only the shortest path is highlighted. If multiple paths are equal in length, then one path of the multiple paths may be highlighted. The path chosen may be based on certain criteria, such as the path that includes the publications having the most citations to other publications, or may simply be selected at random from each of the equal length paths. In alternative embodiments, the most direct connection may be highlighted using other techniques such as by changing the color of the connectors or drawing a glow around the connectors by adding a brightly colored shadow proximate to the connectors.

Figure 9:
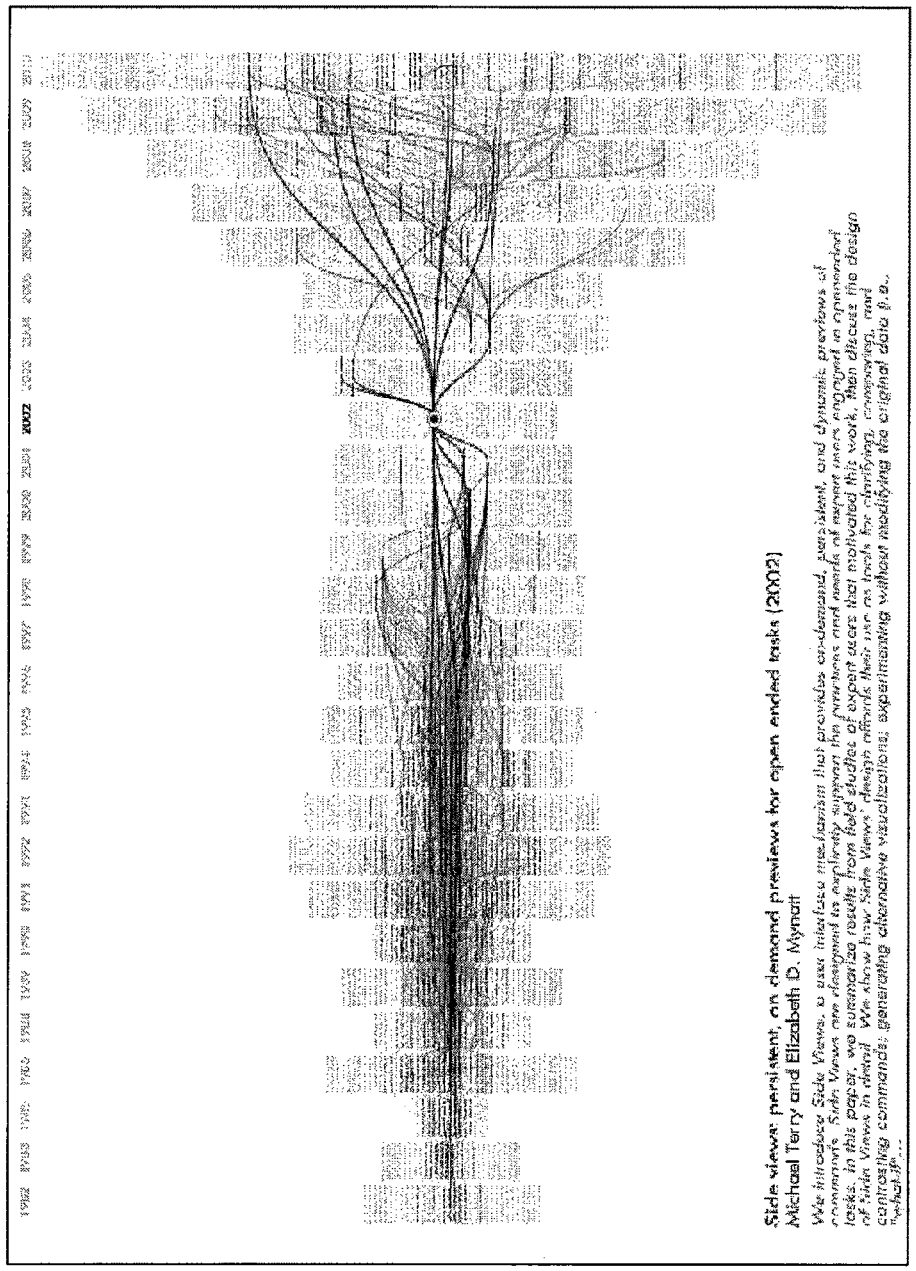
FIG. 9 shows a screenshot of one implementation of the visualization technique, according to one example embodiment of the present disclosure.

FIG. 9 shows a screenshot of one implementation of the visualization technique, according to one example embodiment of the present disclosure. The screenshot reflects a graphical user interface generated by a Java Applet embedded in a web page. It will be appreciated that the number of publications 300 in the database 255(0) displayed in the screenshot may be very large and that, therefore, viewing the information in each column 420 may be difficult. Therefore, in some embodiments, application 150 may implement pan and zoom features that allow a user to focus on a specific area of the image 400. In addition, although not explicitly shown, certain features of application 150 may allow a user to perform functions related to the image 400 such as outputting a selected publication to a file in a specific format (e.g., the portable document format (PDF)), printing a selected publication, or generating a list of the publications related to the selected publication 300(0).

Figure 10:
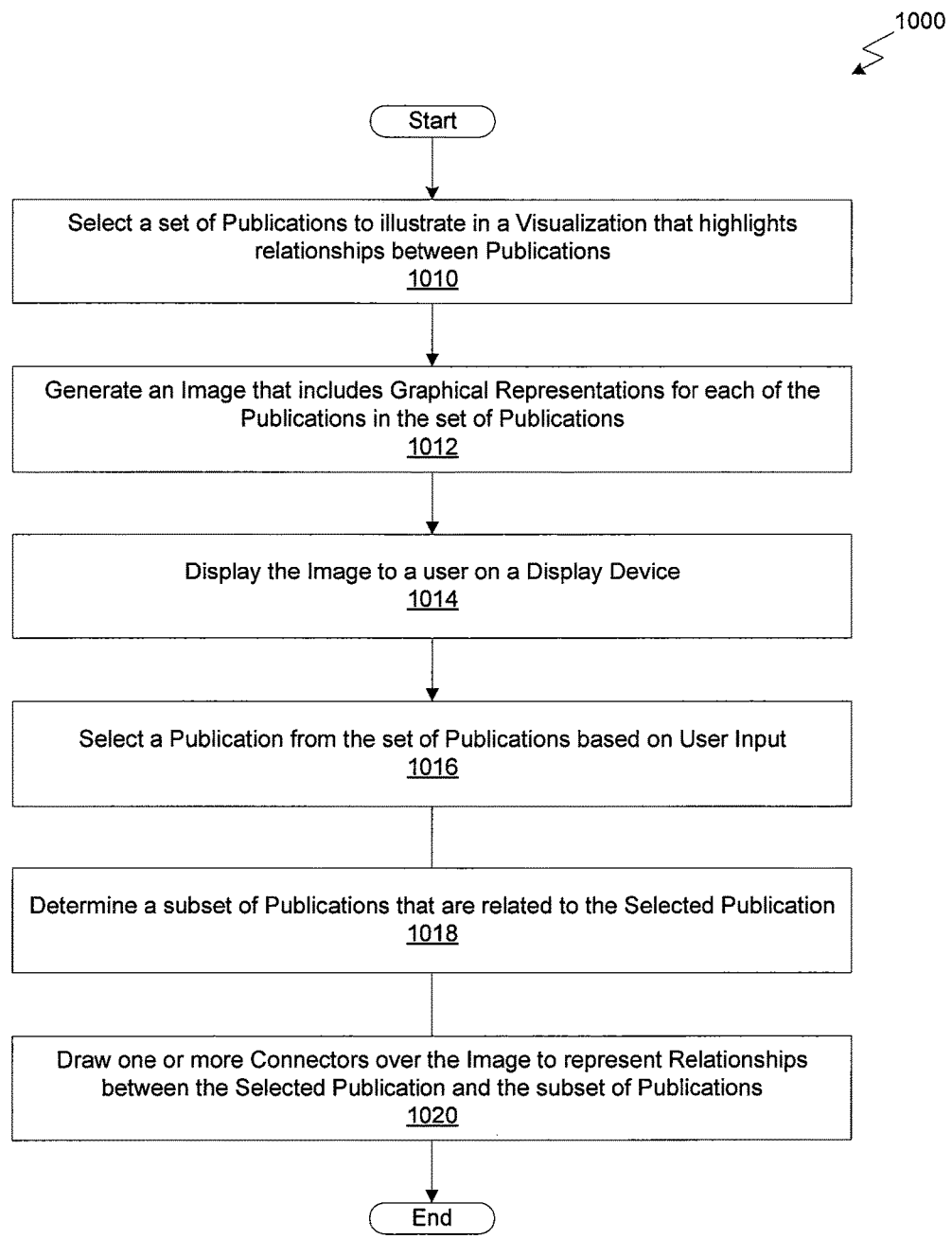
FIG. 10 is a flowchart of method steps for illustrating relationships between publications, according to one example embodiment of the present disclosure.

FIG. 10 is a flowchart of method steps 1000 for illustrating relationships between publications 300, according to one example embodiment of the present disclosure. Although the method steps are described in conjunction with the systems of FIGS. 1-9, persons skilled in the art will understand that any system configured to perform the method steps, in any order, is within the scope of the present disclosure.

The method 1000 begins at step 1010, where an application 150 selects a set of publications 300 to illustrate in a visualization that highlights relationships between publications 300. In one embodiment, an application 150 selects each of the publications in a particular database 255 as the set of publications 300. In another embodiment, the application 150 selects a subset of the publications in the database 255 based on a set of filter criteria. At step 1012, the application 150 generates the image 400 based on the set of publications 300 such that the image 400 includes a graphical representation 415 for each of the publications 300 in the set of publications 300. In one embodiment, the publications 300 are subdivided into columns 420 based on the year of publication and displayed in an order based on the number of references included in each publication 300. At step 1014, the application 150 displays the image 400 on a display device 110 to be viewed by a user.

At step 1016, the application 150 selects a particular publication 300 as the selected publication 300(0) based on user input. In one embodiment, a user may select a publication 300(0) by clicking on a graphical representation 415 of the publication 300(0) in the image 400 with a mouse cursor 530. At step 1018, the application 150 determines a subset of publications 300 related to the selected publication 300(0). In one embodiment, application 150 queries database 255(0) to determine which publications 300 are referenced by the selected publication 300(0). Application may perform additional queries on the related publications to determine multiple generations of relationships between publications 300 in database 255(0) and the selected publication 300(0).

At step 1020, the application 150 draws one or more connectors (e.g., 620, 720) over the image 400 to represent relationships between the selected publication 300(0) and one or more other publications 300 in the set. In one embodiment, connectors 620 are drawn from the selected publication 300(0) to any publications referenced by a citation in the selected publication 300(0). The application 150 may also draw connectors 720 to any publications referenced by a citation in the publications referenced by a citation in the selected publication 300(0) (i.e., $2^{nd}$ generation), and so forth up to the number of generations that the application 150 is configured to display. In another embodiment, the application 150 may be configured to illustrate descendent relationships in addition to ancestor relationships by drawing additional connectors in a different color. Then, method 1000 terminates.

In sum, the present disclosure describes a system and method for visualizing the relationships between publications. Visualizations provide a valuable tool that enables a user to understand a system of related objects. By charting relationships between publications based on the references to other publications found in the set of publications, a user can quickly select a subset of publications within the larger database to examine that are likely to be related to a particular subject of interest. Searching through a database for specific publications using such visualizations is more productive that a simple keyword based query because of the additional context that can be conveyed using the graphic-based technique.

It will be appreciated that visualizations of relationships between objects stored in a database may be generated and displayed for general objects that can be linked by references to other objects. In other words, the scope of the present disclosure is not limited to publications, but instead encompasses other types of digital objects such as digital images or digital audio. For example, audio files may contain samples of derivative works that may be linked in similar parent/child relationships as described herein. Thus, visualizations of a database of audio files may be generated and displayed in similar fashion to the visualizations associated with a database of publications. Visualizations associated with a digital repository of generic data objects that reference other data objects are within the scope of the present disclosure.

While the foregoing is directed to certain example embodiments, other and further embodiments may be devised without departing from the basic scope thereof. For example, aspects of the embodiments may be implemented in hardware or software or in a combination of hardware and software. One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the aforementioned functions, are included as example embodiments.

In view of the foregoing, the scope of the present disclosure is determined by the claims that follow.

What is claimed is:

1. A computer-implemented method for displaying one or more relationships between objects on a display device, the method comprising:
    generating, via an application executing on a processor, an image that includes a graphical representation for each object in a set of objects;
    selecting a first object in the set of objects based on user input;
    determining a subset of two or more ancestor objects included in the set of objects, wherein each ancestor object is an ancestor of the first object;
    overlaying on the image, for each ancestor object, an ancestor connector that indicates an ancestor relationship between the first object and the ancestor object;
    determining a subset of two or more descendent objects included in the set of objects, wherein each descendent object is a descendent of the first object;
    overlaying on the image, for each descendent object, a descendent connector that indicates a descendent relationship between the first object and the descendent object;
    selecting a second object in the set of objects based on user input; and
    overlaying on the image a first set of one or more connectors indicating a first shortest path from the first object to the second object and a second set of one or more connectors indicating a second shortest path from the first object to the second object, wherein the first and second shortest paths are equal in length, and the application is configured to automatically select and display the first set of connectors to have a different appearance than the second set of connectors, the ancestor connectors for the ancestor objects, and the descendent connectors for the descendent objects.

2. The method of claim 1, wherein the set of objects comprises at least a portion of a database of publications, and wherein each object comprises a data structure including metadata related to one of the publications in the database.

3. The method of claim 2, further comprising selecting the set of objects by filtering the database of publications to select at least a portion of the objects in the database based on one or more filter criteria.

4. The method of claim 1, wherein a first connector is rendered in a first color and a second connector is rendered in a second color.

5. The method of claim 1, further comprising:
    determining that a mouse cursor is hovering over a particular object in the subset of objects; and
    displaying metadata that corresponds with the particular object over the image.

6. The method of claim 1, wherein the first object comprises a reference to the ancestor object.

7. The method of claim 1, wherein the descendent object comprises a reference to the first object.

8. The method of claim 7, wherein:
    the first shortest path comprises a first set of objects;
    the second shortest path comprises a second set of objects; and
    the application is configured to automatically select and display the first set of connectors to have a different appearance based on a total number of objects related to the first set of objects being greater than a total number of objects related to the second set of objects.

9. The method of claim 1, wherein:
    the first shortest path comprises a first set of objects; and
    the application is configured to automatically select and display the first set of connectors to have a different appearance based on a total number of objects related to the first set of objects.

10. A computer-readable storage medium containing a program that, when executed by a processor, causes the processor to perform an operation for displaying one or more relationships between objects on a display device, the operation comprising:
    generating, via an application executing on a processor, an image that includes a graphical representation for each object in a set of objects;
    selecting a first object in the set of objects based on user input;
    determining a subset of two or more ancestor objects included in the set of objects, wherein each ancestor object is an ancestor of the first object;
    overlaying on the image, for each ancestor object, an ancestor connector that indicates an ancestor relationship between the first object and the ancestor object;
    determining a subset of two or more descendent objects included in the set of objects, wherein each descendent object is a descendent of the first object;
    overlaying on the image, for each descendent object, a descendent connector that indicates a descendent relationship between the first object and the descendent object;
    selecting a second object in the set of objects based on user input; and
    overlaying on the image a first set of one or more connectors indicating a first shortest path from the first object to the second object and a second set of one or more connectors indicating a second shortest path from the first object to the second object, wherein the first and second shortest paths are equal in length, and the application is configured to automatically select and display the first set of connectors to have a different appearance than the second set of connectors, the ancestor connectors for the ancestor objects, and the descendent connectors for the descendent objects.

11. The computer-readable storage medium of claim 10, wherein the set of objects comprises at least a portion of a database of publications, and wherein each object comprises a data structure including metadata related to one of the publications in the database.

12. The computer-readable storage medium of claim 11, the operation further comprising selecting the set of objects by filtering the database of publications to select at least a portion of the objects in the database based on one or more filter criteria.

13. The computer-readable storage medium of claim 10, wherein a first connector is rendered in a first color and a second connector is rendered in a second color.

14. The computer-readable storage medium of claim 10, the operation further comprising:
   determining that a mouse cursor is hovering over a particular object in the subset of objects; and
   displaying metadata that corresponds with the particular object over the image.

15. A system for displaying one or more relationships between objects on a display device, the system comprising:
   a processor; and
   a memory coupled to the processor, wherein the memory includes an application configured to:
      generate an image that includes a graphical representation for each object in a set of objects,
      select a first object in the set of objects based on user input,
      determine a subset of two or more ancestor objects included in the set of objects, wherein each ancestor object is an ancestor of the first object,
      overlay on the image, for each ancestor object, an ancestor connector that indicates an ancestor relationship between the first object and the ancestor object;
      determine a subset of two or more descendent objects included in the set of objects, wherein each descendent object is a descendent of the first object; and
      overlay on the image, for each descendent object, a descendent connector that indicates a descendent relationship between the first object and the descendent object;
      select a second object in the set of objects based on user input; and
      overlay on the image a first set of one or more connectors indicating a first shortest path from the first object to the second object and a second set of one or more connectors indicating a second shortest path from the first object to the second object, wherein the first and second shortest paths are equal in length, and the application is configured to automatically select and display the first set of connectors to have a different appearance than the second set of connectors, the ancestor connectors for the ancestor objects, and the descendent connectors for the descendent objects.

16. The system of claim 15, further comprising a database of publications stored in a non-volatile storage device accessible by the processor, wherein the set of objects comprises at least a portion of the objects in the database, and wherein each object comprises a data structure including metadata related to one of the publications in the database.

* * * * *

UNITED STATES PATENT AND TRADEMARK OFFICE
CERTIFICATE OF CORRECTION

PATENT NO. : 10,331,721 B2  
APPLICATION NO. : 13/530003  
DATED : June 25, 2019  
INVENTOR(S) : Justin Frank Matejka, Tovi Grossman and George Fitzmaurice Page 1 of 1

It is certified that error appears in the above-identified patent and that said Letters Patent is hereby corrected as shown below:

On the Title Page

(56) References Cited:
Please delete "Boutin, Franccÿis, and Mountaz Hascoët. "Multi-level exploration of citation graphs." Research and Advanced Technology for Digital Libraries. Springer Berlin Heidelburg, 2004. 366-377.*" and insert --Boutin, François, and Mountaz Hascoët. "Multi-level exploration of citation graphs." Research and Advanced Technology for Digital Libraries. Springer Berlin Heidelburg, 2004. 366-377.*--.

Signed and Sealed this  
Twenty-second Day of October, 2019

Andrei Iancu  
*Director of the United States Patent and Trademark Office*